(12) United States Patent
Kenison et al.

(10) Patent No.: US 9,416,648 B2
(45) Date of Patent: Aug. 16, 2016

(54) PRESSURE BALANCED FLOW THROUGH LOAD MEASUREMENT

(71) Applicant: Schlumberger Technology Corporation, Sugar Land, TX (US)

(72) Inventors: Michael Kenison, Richmond, TX (US); Richard Morrison, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 304 days.

(21) Appl. No.: 14/014,103

(22) Filed: Aug. 29, 2013

(65) Prior Publication Data

US 2015/0059463 A1 Mar. 5, 2015

(51) Int. Cl.
*E21B 47/00* (2012.01)
*G01L 7/02* (2006.01)

(52) U.S. Cl.
CPC ............. *E21B 47/00* (2013.01); *E21B 47/0006* (2013.01); *G01L 7/022* (2013.01)

(58) Field of Classification Search
CPC ...... G01L 7/022; E21B 47/00; E21B 47/0006
See application file for complete search history.

(56) References Cited

U.S. PATENT DOCUMENTS

| | | | |
|---|---|---|---|
| 3,022,822 A | 2/1962 | McStravick et al. | |
| 3,855,857 A | 12/1974 | Claycomb | |
| 4,359,898 A | 11/1982 | Tanguy et al. | |
| 4,515,011 A | 5/1985 | Beimgraben | |
| 4,608,861 A | 9/1986 | Wachtler et al. | |
| 4,805,449 A | 2/1989 | Das | |
| 4,946,190 A | 8/1990 | Buttner | |
| 5,280,141 A * | 1/1994 | Neeleman | G01G 21/30 177/211 |
| 6,009,216 A | 12/1999 | Pruett et al. | |
| 6,296,066 B1 | 10/2001 | Terry et al. | |
| 6,425,443 B1 | 7/2002 | Hill et al. | |
| 6,662,645 B2 | 12/2003 | Brewer | |
| 7,165,612 B2 | 1/2007 | McLaughlin | |
| 7,420,475 B2 | 9/2008 | Adnan et al. | |
| 7,591,314 B2 | 9/2009 | Sonnier et al. | |
| 2005/0263281 A1 | 12/2005 | Lovell et al. | |
| 2006/0044156 A1 | 3/2006 | Adnan et al. | |
| 2006/0070734 A1 | 4/2006 | Zillinger et al. | |
| 2009/0071645 A1 | 3/2009 | Kenison et al. | |
| 2012/0279322 A1 * | 11/2012 | Ratcliffe | E21B 47/0006 73/862.627 |

FOREIGN PATENT DOCUMENTS

| | | |
|---|---|---|
| WO | 2006071591 A2 | 7/2006 |
| WO | 2006071670 A2 | 7/2006 |

* cited by examiner

*Primary Examiner* — John Fitzgerald
*Assistant Examiner* — David Z Huang
(74) *Attorney, Agent, or Firm* — Michael L. Flynn; Tim Curington

(57) ABSTRACT

A technique facilitates measuring loads while compensating for the effects of differential pressure. The technique utilizes a load cell comprising a chassis and a sensing element mounted on the chassis. A housing encloses the sensing element in a chamber formed between the chassis and the housing. The housing is connected to the chassis in a manner to transfer loading, e.g. compressive, tensile, and/or torque loading. A pressure compensating piston is positioned within an interior of the chassis and the housing. A plurality of seal points is located in a manner which isolates the sensing element from the effects of differential pressures between the interior and an exterior of the load cell.

17 Claims, 3 Drawing Sheets

PRESSURE BALANCED FLOW THROUGH LOAD MEASUREMENT

BACKGROUND

Force monitoring devices and equipment are employed in well related applications and in a variety of other types of applications. A force measurement device may be combined with equipment to measure the various loads to which the equipment is subjected during a given operation. In downhole well applications, for example, strain gauges may be used to monitor forces in drill pipe, coiled tubing, bottom hole assembly components, and/or other well related tubular components. The strain gauges may be employed to measure tensile loading, compression loading, and/or torque loading. However, differential pressure between the inside of the tubular component and the surrounding annulus can generate a hydraulic push or pulling force on the tubular, and the forces resulting from the differential pressure affect the strain gauge measurements.

SUMMARY

In general, a methodology and system are provided for measuring loads while compensating for the effects of differential pressure. An embodiment of the technique utilizes a load cell comprising a chassis and a sensing element mounted on the chassis. A housing encloses the sensing element in a chamber formed between the chassis and the housing. The housing is connected to the chassis in a manner to transfer loading, e.g. compressive, tensile, and/or torque loading. A pressure compensating piston is positioned within an interior of the chassis, and a plurality of seal points is created by seals between the load cell components. The seal points are located in a manner which isolates the sensing element from the effects of differential pressures between the interior and an exterior of the load cell. In a well application, for example, the interior and exterior of the load cell may be exposed to the interior of a tubular component and the annulus surrounding the tubular component, respectively.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
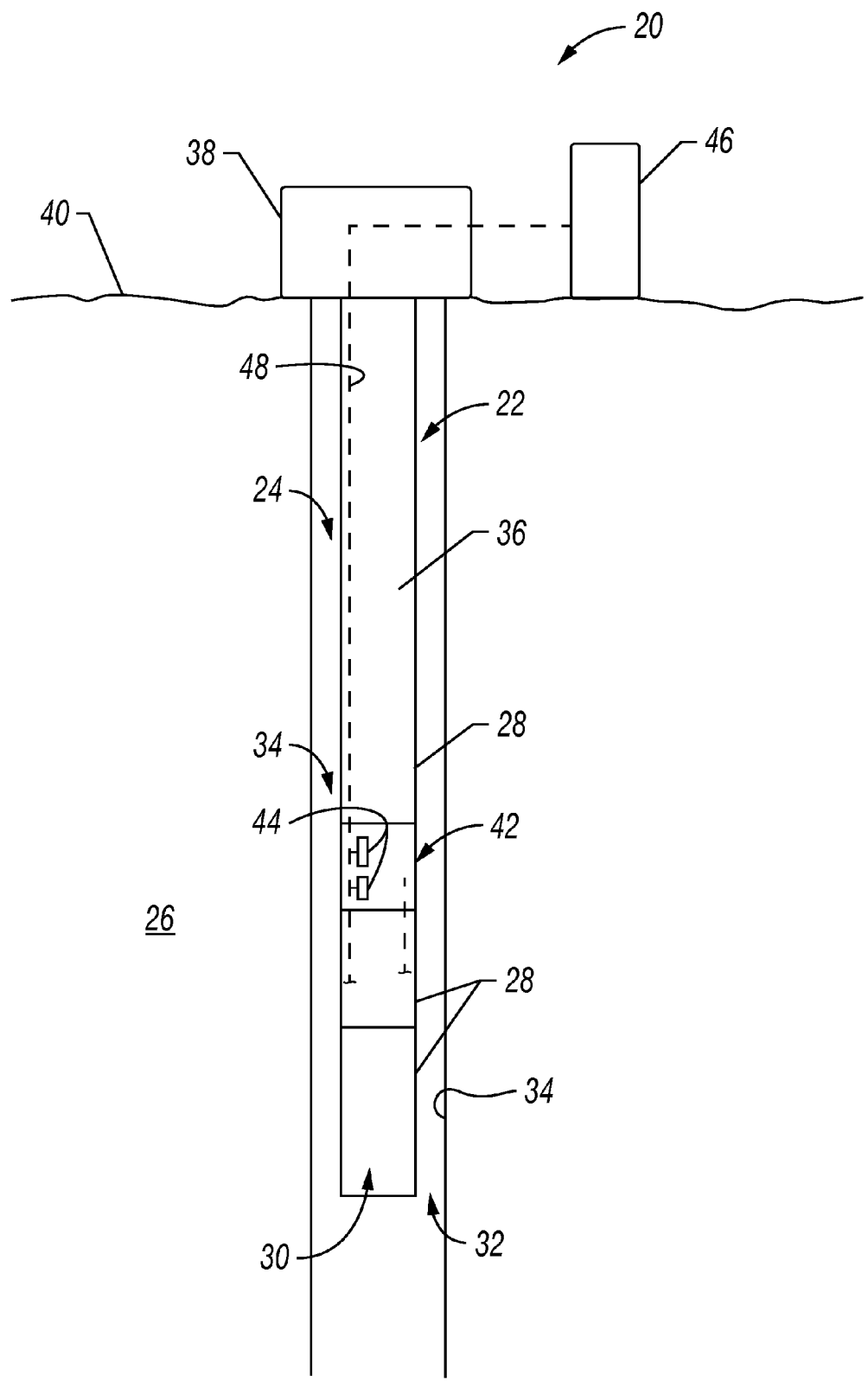
FIG. 1 is a schematic illustration of an example of a well system incorporating an embodiment of a load cell, according to an embodiment of the disclosure.

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

The present disclosure generally relates to a system and methodology for measuring loads while compensating for the effects of differential pressure. In wellbore applications, for example, mechanical forces applied downhole can be separated from hydraulic forces due to differential pressures acting on the system. The system and methodology utilize a load cell comprising a chassis and a sensing element mounted on the chassis. In an embodiment, a housing is combined with the chassis and encloses the sensing element in a chamber formed between the chassis and the housing. The housing is connected to the chassis in a manner to transfer mechanically applied loading, e.g. compressive, tensile, and/or torque loading.

A pressure compensating piston is movably engaged with an interior of the chassis and the housing at a plurality of seal points. The piston seal points, as well as additional seal points, are located in a manner which isolates the sensing element from the effects of differential pressures between the interior and an exterior of the load cell. In a well application, the interior and exterior of the load cell may be exposed to the interior of a tubular component and the annulus surrounding the tubular component, respectively. The arrangement of seal points is established by the configuration of the pressure compensating piston, the housing and the chassis to create pressure affected areas which are sized to compensate for forces created due to the differential pressures acting on the load cell.

In some embodiments, the load cell is combined with a well assembly and deployed downhole in a wellbore. For example, the load cell may be mounted along drill pipe, coiled tubing, a bottom hole assembly, and/or along other tubular components of the well assembly. The interior and exterior of the load cell may be exposed to the interior and exterior pressures, respectively, acting on the tubular component to which the load cell is mounted. The load cell is designed to compensate for the differential pressures so as to provide accurate measurements regarding mechanical loading on the tubular component. The accurate data on mechanical loading is useful in a variety of downhole applications, including drilling applications, milling applications, inflatable packer setting applications, and other applications. However, the load cell also can be used in non-well related applications Depending on the application, individual load cells may be used or a plurality of load cells may be combined with the equipment to measure a variety of mechanical loads. For example, multiple load cells may be deployed along a well string to measure loading at a plurality of locations along the well string. The load cell design provides a way of mechanically balancing the downhole load cell so that externally applied forces are measured regardless of the differential pressure acting on the tubular component and load cell.

Referring generally to FIG. 1, an embodiment of a well system 20 is illustrated although the system should be considered representative of a variety of potential systems and applications, including non-well related systems and applications. In the embodiment illustrated, well system 20 comprises a tubing string 22 deployed in a wellbore 24 drilled into a subterranean formation 26. The wellbore 24 may be a vertical wellbore and/or a deviated wellbore, e.g. a horizontal wellbore. The tubing string 22 comprises a variety of tubular components 28 which may experience pressure differentials between an interior 30 and an exterior 32 of the components. In some applications, exterior 32 may comprise an annulus surrounding the components 28 within a casing 34 lining the wall of wellbore 24. The components 28 are illustrated as employed in wellbore 24, but the components 28 may be utilized in a variety of other types of systems, including surface systems and non-well related systems experiencing pressure differentials between interior and exterior regions.

In some applications, components 28 may comprise a well assembly 34, such as a bottom hole assembly, although the components 28 may comprise many other types of assemblies. The components 28 of well assembly 34 also may comprise a conveyance 36, e.g. coiled tubing, drill pipe, production tubing, or other suitable conveyances. In the illustrated example, the conveyance 36 extends up through wellbore 24 to a wellhead or other surface equipment 38 positioned at a surface location 40. Depending on the application, surface location 40 may be an earth surface or a subsea surface, e.g. a seabed.

The components 28, e.g. well assembly 34, further comprise a load cell 42 having a sensing element 44 or a plurality of sensing elements 44. The sensing elements 44 may be designed to sense a variety of parameters which can affect components 28. At least one of the sensing elements 44 may comprise a load sensor designed to sense loading placed on certain components 28 during a given operation. By way of example, the load sensor 44 may be in the form of a strain sensor which outputs data on strains experienced by the load cell 42 (and thus also experienced by the corresponding component or components 28). The data output by each sensor 44 may be delivered to a processing system 46 via a communication line 48, e.g. a hard wired or wireless type of communication line. In some applications, processing system 46 is a surface-based processing system, as illustrated. In other applications, the data may be stored or processed and stored in memory locally.

The load cell 42 is designed to separate and allow measurement of mechanically applied forces downhole while separating them from hydraulic forces due to differential pressures between interior 30 and exterior 32. As described in greater detail below, the load cell 42 is designed to isolate the sensing element(s) 44 from the effects of differential pressures between the interior 30 and the exterior 32 of the load cell 42 and corresponding components 28. By reducing or removing the effects of differential pressures, the load cell 42 is able to monitor the externally applied forces, e.g. tensile forces, compressive forces, and/or torque forces, regardless of the differential pressure. Monitoring of the externally applied forces can be useful during many types of operations, including drilling operations, milling operations, packer setting operations, well intervention operations such as perforating operations, coiled tubing operations, and other well and non-well related operations.

Figure 2:
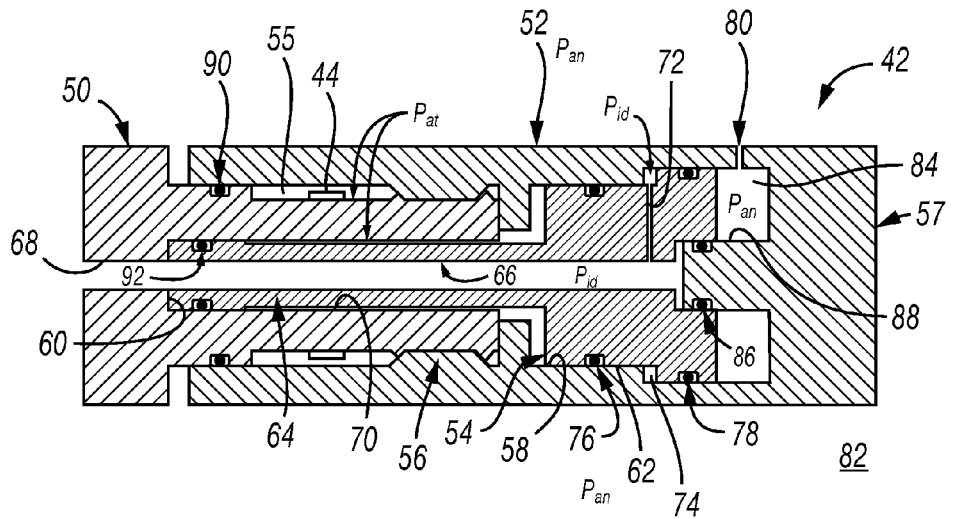
FIG. 2 is a cross-sectional illustration of an example of a load cell, according to an embodiment of the disclosure.

Referring generally to FIG. 2, an embodiment of load cell 42 is illustrated. In this embodiment, the load cell 42 comprises a load cell chassis 50 on which the sensing element 44 (or elements 44) is mounted. In some applications, the sensing element 44 is a strain sensor positioned to sense strain in a section of the load cell chassis 50. The load cell 42 also comprises an outer housing 52 and a pressure compensating piston 54. The outer housing 52 is positioned around at least a portion of the load cell chassis 50 to enclose the sensing element 44 in a chamber 55, which may be a sealed chamber. In an embodiment, the chamber 55 is air-filled or gas-filled. In an embodiment, the chamber is liquid-filled, such as filled with an oil or the like. The outer housing 52 also is rigidly connected to the load cell chassis 50 via a rigid connection 56 which can transfer, for example, tensile loads, compressive loads, and torque loads between an end 57 of outer housing 52 and load cell chassis 50.

The pressure compensating piston 54 is installed within an interior 58 of outer housing 52 and shoulders inside load cell chassis 50 at chassis shoulder 60. The pressure compensating piston 54 is installed inside the outer housing 52 and is movably engaged with respect to the load cell chassis 50 and the outer housing 52. In other words, the pressure compensating piston 54 is not rigidly connected to outer housing 52 or to load cell chassis 50 in this embodiment. In some applications, the outer housing 52 is constructed in two or more pieces to facilitate installation of pressure compensating piston 54 within the interior 58.

In the example illustrated, pressure compensating piston 54 comprises a piston head 62 and a piston extension 64 extending from piston head 62. The pressure compensating piston 54 also has an internal passage 66 extending through the piston head 62 and the piston extension 64. The internal passage 66 is in communication with a corresponding internal passage 68 of load cell chassis 50, as illustrated. In the example illustrated, the piston head 62 is movably, e.g. slideably, received within interior 58 of outer housing 52 and piston extension 64 is movably, e.g. slideably, received within a corresponding interior region 70 of load cell chassis 50.

The pressure compensating piston 54 also may comprise a pressure passage 72 located in, for example, piston head 62. The passage 72 extends between the internal passage 66 of piston 54 and a chamber or region 74 located between pressure compensating piston 54 and the surrounding outer housing 52. The cavity or region 74 is bounded and sealed by seal elements 76 and 78 deployed along an interior surface of outer housing 52. Another pressure passage 80 may extend between the interior 58 of outer housing 52 and a surrounding exterior 82. The passage 80 extends to a chamber or region 84 of interior 58 which is bounded and sealed by seal element 78 and a seal element 86 located on an internal extension 88 of outer housing 52.

In the illustrated example, load cell 42 comprises additional seal elements. For example, a seal element 90 may be located between load cell chassis 50 and outer housing 52 at a location to seal in chamber 55 and sensing element 44. Additionally, a seal element 92 may be located between pressure compensating piston 54 and load cell chassis 50. For example, seal element 92 may be located between piston extension 64 and the surface forming interior 70 of load cell chassis 50. In this embodiment, piston extension 64 spans the rigid connection 56, and the seal element 92 is located on an opposite side of the rigid connection 56 from piston head 62 as well as a distance from the sensing element 44.

The seal elements 76, 78, 86, 90 and 92 may comprise a variety of seals. Examples of seals 76, 78, 86, 90 and 92 comprise O-ring seals, T seals, or other suitable seals positioned between the adjacent components. The seal elements 76, 78, 86, 90 and 92 provide seal points which are located along the pressure compensating piston 54, as well as along load cell chassis 50 and outer housing 52, in an arrangement which enables the pressure compensating piston 54 to compensate for differential pressures acting on the outer housing 52 and load cell chassis 50. The differential pressures are compensated so as to isolate the sensing element (or elements) 44 from the effects of the differential pressures.

In the embodiment illustrated in FIG. 2, seals 90, 92 and 76 maintain an ambient or atmospheric chamber 55 (pressure is equal to $P_{at}$) with respect to the portion of the load cell chassis 50 on which the sensing element 44 is mounted. The pressure, $P_{at}$, in the chamber 55 may be affected by downhole temperature (i.e., an increase in temperature may cause a corresponding increase in $P_{at}$, depending on the fluid, if any, disposed in the chamber 55) but such a pressure increase does not affect the ability of the load cell to compensate for the differential pressure acting thereon and the ability of the load cell 42 to provide accurate mechanical loading measurements on the tubular component attached to the load cell 42. Passage 72 in pressure compensating piston 54 permits fluid, e.g. gas, liquid, or multi-phase fluid, and pressure to communicate between internal passage 66, having pressure equal to $P_{id}$, and the chamber or region 74 between outer housing 52 and pressure compensating piston 54. The chamber 74 is sealed by seal elements 76 and 78. Additionally, passage 80 in outer housing 52 permits fluid, e.g. gas, liquid, or multi-phase fluid, and pressure to communicate between exterior 82, having pressure equal to $P_{an}$, and the chamber or region 84 between pressure compensating piston 54 and the outer housing 52. The chamber 84 is sealed by seal elements 78 and 86.

The configuration of load cell chassis 50, outer housing 52, and pressure compensating piston 54 along with the seal point placement via seal elements 76, 78, 86, 90, 92 create pressure affected areas which are appropriately sized to compensate for forces due to differential pressures acting on the interior and exterior of the load cell 42. For example, the component configurations and seal points may be arranged to compensate for forces due to differential pressures between internal passages 66, 68 and exterior 82 so as to isolate the sensing element (or sensing elements) 44 from the effects of the differential pressures acting on these regions.

Figure 3:
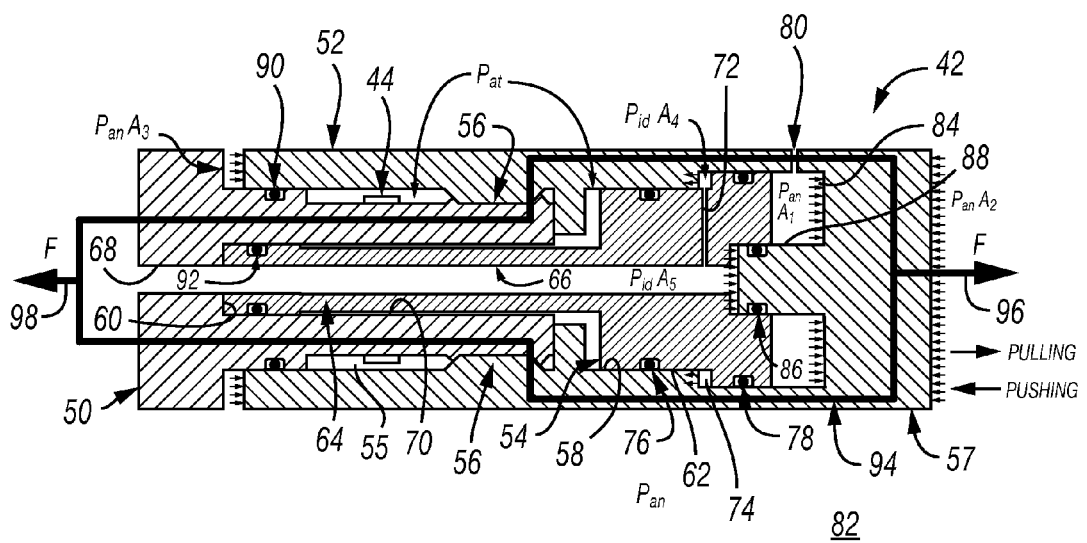
FIG. 3 is a cross-sectional illustration similar to that of FIG. 2 but showing a load path and a plurality of pressure affected areas created by seal points, according to an embodiment of the disclosure.

Referring generally to FIG. 3, the load cell 42 is illustrated as showing an example of a load path 94 extending through outer housing 52 and load cell chassis 50. The load path 94 may result from pulling forces, as represented by arrow 96, and/or pushing forces, as represented by arrow 98, acting on outer housing end 57. Arrows 96 and 98 also represent the pulling and pushing directions, respectively, referenced when describing certain embodiments herein. Depending on the application, the load path 94 also may be formed or affected by torque forces acting on outer housing end 57. FIG. 3 also illustrates pressure affected areas established by the configuration of load cell chassis 50, outer housing 52, pressure compensating piston 54, and the location of seal elements 76, 78, 86, 90, 92. Pressure affected areas have been labeled $A_1$, $A_2$, $A_3$, $A_4$ and $A_5$.

Externally applied forces, e.g. tension, compression, and/or torque, which may be applied to end 57 of outer housing 52 are transmitted from outer housing 52 to the load cell chassis 50 via the rigid connection 56. The external forces applied through rigid connection 56 cause loading, e.g. strain, in the load cell chassis 50 which is sensed by the sensing element 44. To reduce or remove differential pressure effects on the sensing element 44, the load cell 42 is pressure compensated by the pressure affected areas $A_1$, $A_2$, $A_3$, $A_4$ and $A_5$ which are designed to create counteracting forces. For example, pressure $P_{an}$ acts against the pressure affected area $A_1$ created by sealing elements 78 and 86, causing a force $F_1$ equal to $P_{an}*A_1$ which pulls on the load cell chassis 50 via the rigid connection 56. $P_{an}$ also acts upon pressure affected area $A_2$ located on the outside of outer housing 52 to create a force $F_2$ equal to $P_{an}*A_2$ which pushes on the load cell chassis 50. $P_{an}$ further acts on pressure affected area $A_3$ defined by seal element 90, thus creating a force $F_3$ equal to $P_{an}*A_3$ which pulls on the load cell chassis 50. The internal pressure $P_{id}$ acts on pressure affected area $A_4$ defined by seal elements 76 and 78, creating a force $F_4$ equal to $P_{id}*A_4$ which pushes on the load cell chassis 50. The internal pressure $P_{id}$ also acts on pressure affected area $A_5$ defined by seal element 86, creating a force $F_5$ equal to $P_{id}*A_5$ which pulls on the load cell chassis 50.

The following equations represent the pulling and pushing forces acting on the outer housing 52.

$$\text{Total Hydraulic Pulling Forces} = P_{an}*A_1 + P_{an}*A_3 + P_{id}*A_5 \qquad (1)$$

$$\text{Total Hydraulic Pushing Forces} = P_{an}*A_2 + P_{id}*A_4 \qquad (2)$$

The hydraulically induced forces are transferred to the load cell chassis 50 and the sensing element 44 through the outer housing 52. Therefore, if the hydraulic push and pull forces on the outer housing 52 are equal, the net hydraulic force on the load cell chassis 50 will be zero, which is the desired result. Setting Equations (1) and (2) equal to each other yields:

$$P_{an}*A_1 + P_{an}*A_3 + P_{id}*A_5 = P_{an}*A_2 + P_{id}*A_4 \qquad (3)$$

If the sealing diameters defined by 76 and 90 are equivalent and thus balanced for hydrostatic pressure, the following geometric relationship holds true for pressure affected area $A_2$.

$$A_2 = A_1 + A_5 - A_4 + A_3 \qquad (4)$$

Substituting $A_2$ into Equation (3) yields:

$$P_{an}*A_1 + P_{an}*A_3 + P_{id}*A_5 = P_{an}*A_1 + P_{an}*A_5 - P_{an}*A_4 + P_{an}*A_3 + P_{id}*A_4 \qquad (5)$$

Cancelling out $P_{an}*A_1$ and $P_{an}*A_3$ from each side leaves:

$$P_{id}*A_5 = P_{an}*A_5 - P_{an}*A_4 + P_{id}*A_4 \qquad (6)$$

Rearranging the equation yields:

$$(P_{id} - P_{an})A_5 = (P_{id} - P_{an})A_4 \qquad (7)$$

Thus:

$$A_5 = A_4 \qquad (8)$$

Therefore, if $A_5$ is equal to $A_4$, the pushing and pulling forces on the outer housing 52 are balanced, and hydraulic forces due to differential pressure have no effect on the measurements sensed by sensing element 44 and thus have no effect on the output of load cell 42. It should be noted that there may be substantial pushing force on the pressure compensating piston 54 which shoulders on the load cell chassis 50 at shoulder 60; however the shouldering is accomplished beyond the portion of the load cell chassis 50 on which the sensing element 44 is mounted so this force bypasses the sensing element 44. In the illustrated embodiment, for example, shoulder 60 is located on an opposite side of sensing element 44 relative to rigid connection 56.

Figure 4:
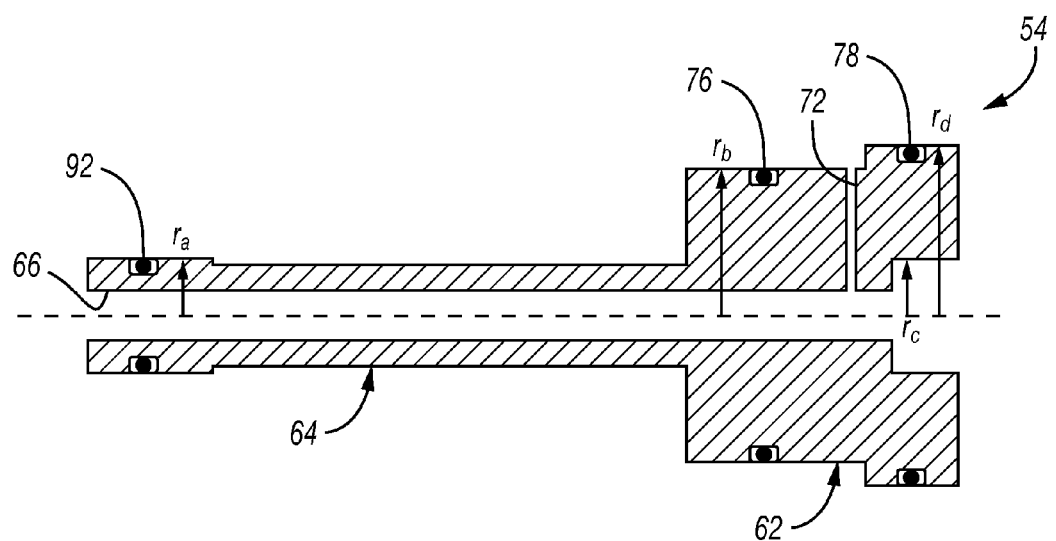
FIG. 4 is a cross-sectional view of an example of a pressure compensating piston that may be employed with the load cell, according to an embodiment of the disclosure.

Referring generally to FIG. 4 which illustrates the pressure compensating piston 54, hydraulic forces can be balanced using the approach described herein when the following relationship between internal pressure ($P_{id}$) and exterior, e.g. annulus, pressure ($P_{an}$) holds true, otherwise the pressure compensating piston 54 can exert a pulling force on the outer housing 52 which, in turn, can transfer to the load cell chassis 50 and sensing element 44.

$$P_{id} \leq \frac{1}{1 - \frac{(r_b^2 - r_a^2)}{(r_d^2 - r_c^2)}} P_{an} \qquad (9)$$

The radii (r) are referenced in FIG. 4. If the configuration of load cell 42 is such that Equation (9) is not valid and the pressure compensating piston 54 consequently exerts a pulling force on the outer housing 52, such a situation can be addressed mechanically. For example, the load cell chassis 50 may be attached (e.g. attached by threaded connection) to the pressure compensating piston 54 near seal element 92. In this latter embodiment, the attachment of pressure compensating piston 54 to the load cell chassis 50 near seal element 92 creates a structure in which such pulling force exerted by the pressure compensating piston 54 is not be felt by the sensing element 44.

Figure 5:
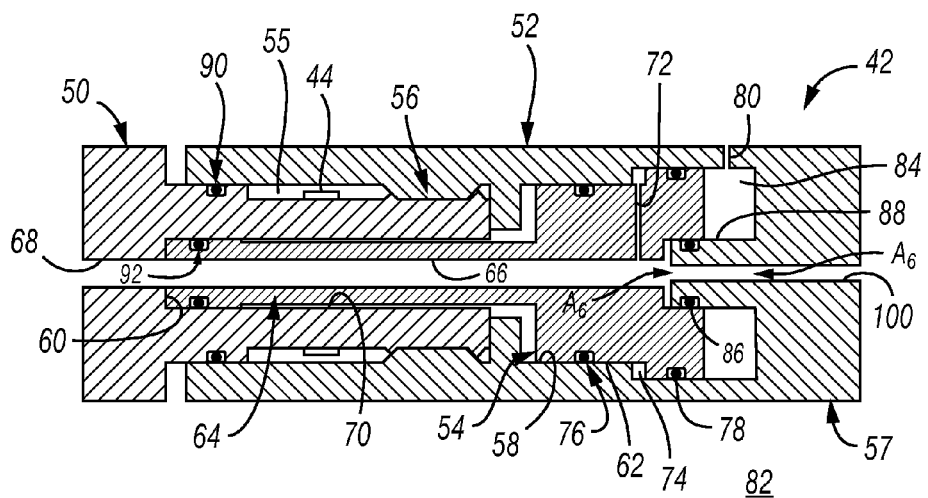
FIG. 5 is a cross-sectional view of another example of the load cell, according to another embodiment of the disclosure.

Referring generally to FIG. 5, another embodiment of load cell 42 is illustrated. In this embodiment, the end 57 of outer housing 52 (and a bottom hole assembly component or other component coupled to end 57) may comprise an internal passage 100. The passage 100 advantageously allows the load cell 42 to accommodate fluid flow therethrough. In this embodiment, pressure affected areas $A_2$ and $A_5$ are reduced by the orifice area $A_6$. Pressure affected area $A_4$ is likewise reduced with respect to Equation 8. However, instead of reducing $A_4$, the resulting force could be accepted and accounted for via processing compensation in processor system 46. The resulting force also could be accepted and accounted for in a measurement error budget. In this embodiment, any forces generated by a fluid flowing through the passage 100 are compensated for by the load cell 42.

As described herein, the overall system 20 may be in the form of a well system or other type of system in which loading is monitored. In well applications, the well system 20 may comprise many types of components combined with the load cell. For example, an individual load cell or a plurality of load cells may be used in combination with various conveyances, bottom hole assemblies, drill strings, servicing strings, completions, and/or a variety of other well assemblies. The load cells also may be used in many types of environments, including subsurface environments, subsea environments, and surface environments.

Additionally, the load cell may have a variety of configurations created in many different sizes depending on the parameters of a given application. The load cell may comprise an individual sensing element or a plurality of sensing elements. The sensing elements may be of a common design or of dissimilar designs. Similarly, the sensing elements may be designed to detect a variety of parameters related to loading as well as parameters in addition to the loading experienced by the load cell. The load cell chassis, outer housing, and compensating piston also may be constructed in a variety of sizes and configurations and with a variety of seal points designed to create the desired pressure affected areas which are able to compensate for differential pressures acting on the load cell. By decoupling the differential pressures from the load sensing element or elements, the load cell may be advantageously utilized in downhole tools to improve the sensitivity and/or accuracy of downhole force measurements, such as those tools utilizing pressure gauges having a margin of error in their measurements, especially in those downhole tools where differential pressure may not be known or measurable. In operation, the chassis and housing may be utilized in a method comprising coupling the chassis and the housing to components of a well assembly, disposing the chassis and housing in a wellbore, performing at least one wellbore operation, sensing a load of the well assembly with the sensing element, and delivering data corresponding to the sensed load to a processing system via a communication line. Performing the wellbore operation may comprise performing at least one of a drilling operation, a milling operation, a packer setting operation, a well intervention operation, a perforating operation, a coiled tubing operation, and other well related operations Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A system for use in a wellbore, comprising:
a well assembly having a load cell, the load cell comprising:
a load cell chassis;
a sensing element mounted on the load cell chassis;
an outer housing rigidly connected to the load cell chassis so as to enclose the sensing element; and
a pressure compensating piston comprising a piston head, a piston extension extending from the piston head, and an internal passage extending through the piston head and piston extension, the piston head exposed to pressure from the internal passage and to a pressure external to the load cell chassis and the outer housing, the pressure compensating piston installed inside the outer housing and movably engaged with respect to the load cell chassis and the outer housing, the pressure compensating piston defining a plurality of pressure affected areas sized to compensate for forces due to differential pressure acting on the interior and exterior of the load cell thereby isolating the sensing element from the effects of the differential pressure.

2. The system as recited in claim 1, wherein the outer housing is rigidly connected to the load cell chassis at a rigid connection which fully transfers externally applied tension, compression, and torque forces from an end of the outer housing to the load cell chassis.

3. The system as recited in claim 2, wherein the forces transferred to the rigid connection are measured by the sensing element.

4. The system as recited in claim 3, wherein the sensing element comprises a strain sensor.

5. The system as recited in claim 1, wherein the pressure affected areas create a plurality of counteracting forces predetermined to protect the sensing element from the effects of the differential pressure.

6. The system as recited in claim 1, wherein the piston extension is slidably received and has a seal point within an interior of the load cell chassis.

7. The system as recited in claim 1, wherein the piston extension spans the rigid connection.

8. The system as recited in claim 1, wherein the piston head is slidably received and has a plurality of seal points within an interior region of the outer housing.

9. The system as recited in claim 8, wherein the piston head is sealed against an interior surface of the outer housing at a pair of locations to create a pressure cavity therebetween, wherein the piston head is exposed to pressure from the internal passage by a pressure flow passage extending between the pressure cavity and the internal passage and a pressure flow passage to an area exterior to the well assembly.

10. A method for pressure compensation, comprising:
placing a sensing element on a chassis;
joining the chassis with a housing which encloses the sensing element in a sealed chamber;
rigidly coupling the housing to the chassis at a rigid connection to transfer loads between the housing and the chassis;
positioning a pressure compensating piston within the chassis in the housing by slidably positioning a piston head of the pressure compensating piston in an interior region of the housing, and slidably positioning a piston extension extending from the piston head in an interior region of the chassis, the pressure compensating piston further comprising an internal passage extending through the piston head and piston extension, the piston head disposed in a pressure cavity and exposed to pressure from the internal passage and to a pressure external to the chassis and the housing; and
locating seal points along the pressure compensating piston in an arrangement which enables the pressure compensating piston to compensate for differential pressures acting on the housing and the chassis in a manner which isolates the sensing element from the effects of the differential pressures.

11. The method as recited in claim 10, wherein placing the sensing element comprises placing a load sensor or a strain sensor on the chassis.

12. The method as recited in claim 10, further comprising coupling the chassis and the housing to components of a well assembly, disposing the chassis and housing in a wellbore, performing at least one wellbore operation, sensing a load of the well assembly with the sensing element, and delivering data corresponding to the sensed load to a processing system via a communication line.

13. The method as recited in claim 12, wherein performing at least one wellbore operation comprises performing at least one of a drilling operation, a milling operation, a packer setting operation, a well intervention operation, a perforating operation, a coiled tubing operation, or other well related operations.

14. A system, comprising:
a load cell having:
a chassis;
a sensing element mounted on the chassis;
a housing enclosing the sensing element in a chamber formed between the chassis and the housing, the housing being connected to the chassis to transfer loading; and
a pressure compensating piston comprising a piston head, a piston extension extending from the piston head, and an internal passage extending through the piston head and piston extension, the piston head exposed to pressure from the internal passage and to a pressure external to the chassis and the housing, the pressure compensating piston slidably engaged with an interior of the chassis and the housing at a plurality of seal points located to isolate the sensing element from the effects of differential pressures between the interior and an exterior of the load cell.

15. The system as recited in claim 14, wherein the sensing element comprises a strain sensor.

16. The system as recited in claim 14, wherein the seal points are created by O-ring seals or T seals.

17. The system as recited in claim 14, wherein at least one of the housing, the chassis, or the pressure compensating piston defines a flow passage therethrough.

* * * * *